United States Patent
Baghdasarian

(10) Patent No.: US 8,021,069 B2
(45) Date of Patent: *Sep. 20, 2011

(54) REDUNDANT RADIAL RELEASE APPARATUS

(75) Inventor: Varouj G. Baghdasarian, Cupertino, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 12/215,041

(22) Filed: Jun. 23, 2008

(65) Prior Publication Data

US 2009/0317174 A1    Dec. 24, 2009

(51) Int. Cl.
   *G05G 17/00*    (2006.01)
(52) U.S. Cl. ............................................ 403/2; 337/401
(58) Field of Classification Search .............. 403/2, 195, 403/316; 74/2; 337/1, 5, 401, 412; 244/158, 244/172.6

See application file for complete search history.

(56) References Cited

U.S. PATENT DOCUMENTS

| | | | | |
|---|---|---|---|---|
| 1,337,642 A * | 4/1920 | Clark | ............................ | 403/311 |
| 4,638,608 A * | 1/1987 | Coy | .................................. | 52/98 |
| 5,282,709 A * | 2/1994 | Chaput et al. | ................. | 411/433 |
| 5,471,888 A * | 12/1995 | McCormick | ........................ | 74/2 |
| 5,716,157 A * | 2/1998 | Kester et al. | .................. | 403/291 |
| 6,133,818 A * | 10/2000 | Hsieh et al. | .................... | 337/401 |
| 6,249,063 B1 * | 6/2001 | Rudoy et al. | .................. | 307/125 |
| 6,433,990 B1 * | 8/2002 | Rudoy et al. | .................. | 361/160 |
| 6,525,920 B2 * | 2/2003 | Rudoy et al. | .................. | 361/160 |
| 6,747,541 B1 * | 6/2004 | Holt et al. | ..................... | 337/401 |
| 2003/0076215 A1 * | 4/2003 | Baghdasarian | ............... | 337/401 |
| 2010/0089189 A1 * | 4/2010 | Rudoy et al. | ........................ | 74/2 |

* cited by examiner

*Primary Examiner* — Joshua T Kennedy
(74) *Attorney, Agent, or Firm* — Michael A. Guth

(57) ABSTRACT

A redundant release apparatus having a multi-segment split spool with a central bore adapted to axially restrain a tensioned member. Two tensioned tapes are overlappingly wound around the spool segments thereby preventing radial movement of the spool segments. Overlapping winding design of each of the tapes provide predictable unwinding dynamics upon release. The multiple segments require less radial motion for release of the tensioned member.

25 Claims, 11 Drawing Sheets

REDUNDANT RADIAL RELEASE APPARATUS

BACKGROUND

1. Field of the Invention

The present invention relates to a redundant release apparatus which may to release such items as antennas, solar arrays, positioning mechanisms, and other devices.

2. Description of Related Art

A release apparatus, such as a separation spool device, is used to release a captured member which constrains the deployment of a spacecraft element, such as a solar array and/or reflectors, in the stowed position. In many prior art devices, the spacecraft element was restrained with a wire or a holddown rod system which was released using a pyrotechnic device. Typically, the pyrotechnic device would fire a blade against a base, with the wire or rod to be cut and released. Although useful in many applications, these devices imparted high shock loads into the units which they were to release, as well as the spacecraft itself.

A design that avoided the shocks associated with pyrotechnic release devices was the separation spool device, which used a fused element to release a captured member. U.S. Pat. No. 6,133,818, to Baghdasarian, discusses a release apparatus wherein two piece split spool with an annulus is used to capture a capture member larger in diameter than the annulus of the spool. The two pieces of the split spool are held together with a wire that is wrapped around the spool. A drawback of this design is that the wire, wrapped under tension around the outside of the spool, may have unpredictable dynamics in some cases when released. In some cases, there may be risk of the wire fouling upon itself when released, which may prevent the spool from spreading far enough apart to allow the captured member to pass through, and thus this may prevent the release device from releasing the stowed spacecraft element. Another drawback of this design is that a two piece spool design presents a geometry that requires significant radial movement of the spool pieces to affect the release.

Further, a two segment spool has geometric limitations as far as load carrying capacity and a phenomenon referred to as "Friction lock up" condition, a failure to release condition due to friction between the spool-to-captured member interface, and the fact that spherical (ball) end of the captured member leaves the segments contacting the two extreme points of each segment. These two points are almost 180 degrees apart for a 2-segment spool. A ball end could easily be prevented from release with very little friction between the ball and the spool interface.

An additional design feature sought out in high reliability areas is redundancy. Thus, a preferred release apparatus would have a design to allow it to release even in the case of a first mechanical failure.

What is called for is a capture spool release device that overcomes the potentially unstable dynamics of wire wrapped spool and the drawbacks of a two segment separation device. What is also called for is a release device with a mechanical redundancy that allows for release even in the case of a first failure.

SUMMARY

A redundant release apparatus having a multi-segment split spool with a central bore adapted to axially restrain a tensioned member. Two tensioned tapes are overlappingly wound around the spool segments thereby preventing radial movement of the spool segments. Overlapping winding design of each of the tapes provide predictable unwinding dynamics upon release.

The multi-segment spool requires less radial motion for release of the tensioned member. The spool is adapted to release a member with the release of either one of two wound tensioned tapes.

DETAILED DESCRIPTION

Figure 1A:
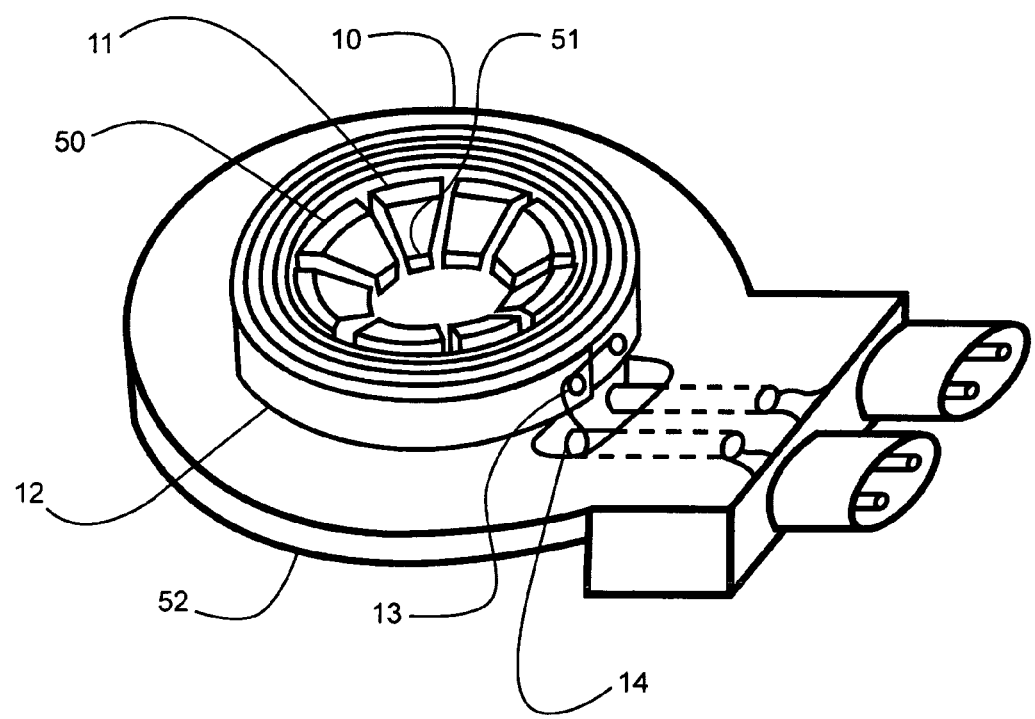
FIG. 1A is a perspective view of portions of a release apparatus according to some embodiments of the present invention.
Figure 1B:
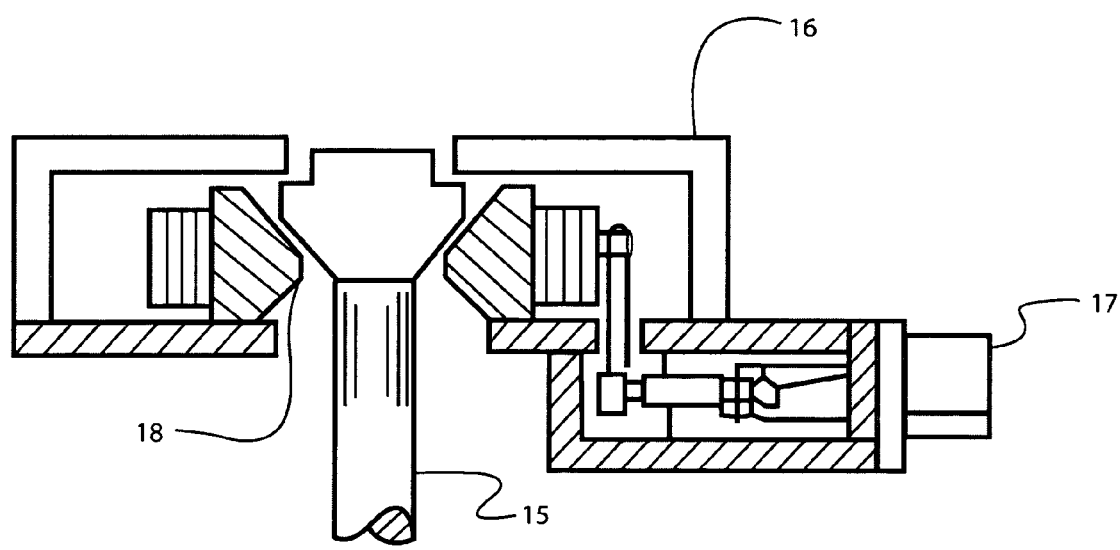
FIG. 1B is a cutaway side view of a release apparatus according to some embodiments of the present invention.
Figure 1C:
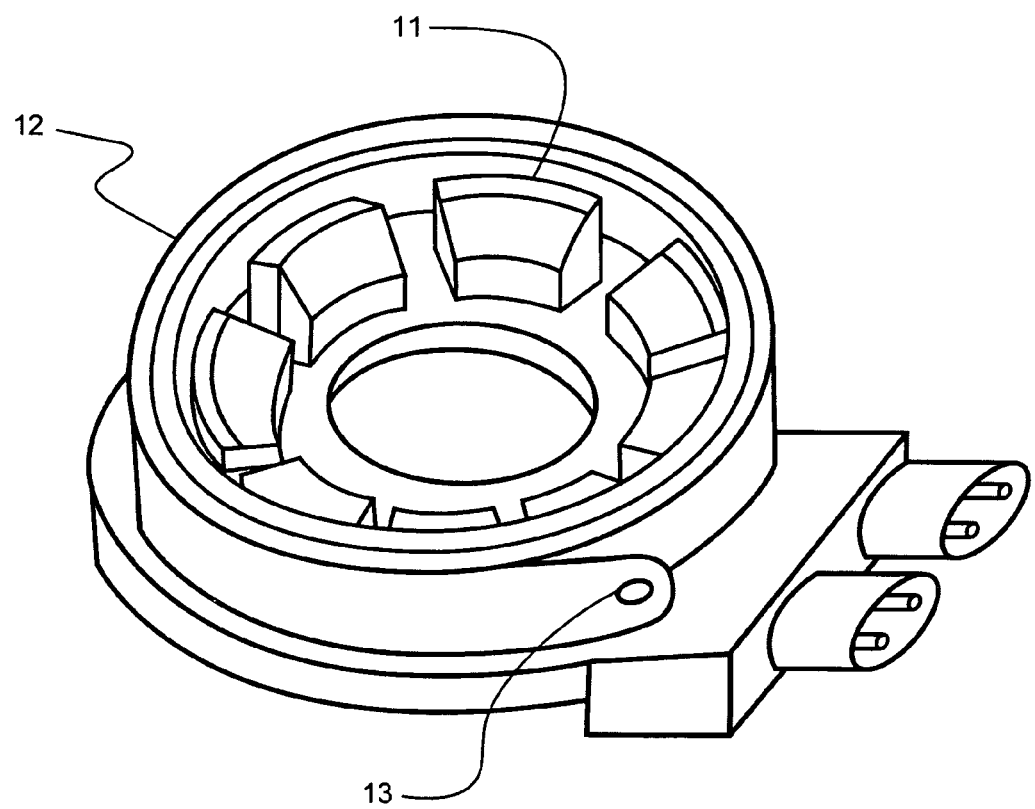
FIG. 1C is a perspective view of portions of a release apparatus according to some embodiments of the present invention.

FIGS. 1A-C illustrate a release apparatus 10 for controlling the deployment of a desired device by releasing a captured member 15 utilizing a multi-piece split spool 11 adapted to restrain the captured member 15. The multi-piece spool 11 consists of three or more segments 50 which define a central bore 51 adapted to restrain a captured member 15. In some embodiments, the spool 11 consists of six segments. In some embodiments, the spool consists of eight segments. As seen in cross-section in FIG. 1A, the segments of the spool are adapted to fittingly receive and axially restrain an expanded portion 18 of the captured member 15 when the segments 50 are constrained together as a unit. The internal area of the spool 11 in the interface area of the spool 11 with the expanded portion 18 of the captured member 15 may be conical in some embodiments. In some embodiments, the internal area of the spool 11 in this region may be a cone or a partial cylinder (or a curved surface other than a cone) with an angle of 30 degrees off of the vertical axis of bore. In some embodiments, the external profile of the expanded portion 18 of the captured member 15 may also be conical. In some embodiments, the interface area may have a curved profile. In some embodiments, the internal area of the spool may be lubricated with a dry lubricant such as molybdenum disulfide.

The spool segments must move a distance sufficient to allow for the outer diameter of the expanded portion of the restrained member to pass through the bore in the axial direction. As the two segments begin to separate, the axial force, which in turn drives the separation of the segments, becomes concentrated on the corners of the segments. With just two segments, the force may be concentrated on just four points. With more force concentrated on each point, the possibility of galling and sticking at a single point, with a resulting failure to release the restrained member, is enhanced. In addition, the distance 37 that the segments must move is at a maximum.

A six piece spool system consists of six spool segments. Thus, the interface surface is broken into six separate pieces. The spool segments must move a distance sufficient to allow for the outer diameter of the expanded portion of the restrained member to pass through the bore in the axial direction. As the segments begin to separate, the axial force, which in turn drives the separation of the segments, will be spread across the segments. The distance that the segments must travel in order to allow the passage of the expanded portion of the restrained member is significantly less than with a two segment spool. The differential offset between the diameter of the segment bore and the diameter of the expanded portion of the restrained member in the multi-piece spool system is significantly smaller than the differential offset in the two piece spool system. This gives the multi-piece spool the distinct advantage of requiring less radial travel distance for each segment in order to release the captured member. The use of a full circumferential spool reduces the contact forces in the interface area of the spool segments and the expanded portion of the restrained member.

A tensioned tape 12 is wrapped around the external periphery of the spool 11. The tape 12 is adapted to constrain the segment 50 of the spool 11 together. A first end of the tape 12 may be removably fastened to one of the segments 50 of the spool 11. The fastening of the tape 12 to one of the segments provides tangential restraint such that the tape may be wound under tension around the outer periphery of the spool, and also will prevent the slipping of the tape around the spool once this tension has been placed in the tape. In some embodiments, the tape 12 may be a spring tempered stainless steel which is 0.2 inches wide and 0.005 inches thick. Once wound under tension, the second end 13 of the tape 12 may be secured under tension by a fuse wire locking device 14 or other restraint and release system.

Securing the second end 13 of the tape may be done to the tape itself or to an external support, not shown in this embodiment. Segments 50 of spool 11 may be prevented from rotation by use of anti-rotation pins between each segment, or by other means.

In some embodiments, the tape 12 is wound with its successive layers over each other in plane. This allows for a much more compact overall design, in the direction of the axis of the spool, of the release device compared to previous designs. Thus, the height of the housing 16 may be kept to a minimum. FIG. 1C illustrates the release apparatus with the tape 12 in relaxed, unwound position. This position is reached after the release of the second end 13 of the tape 12. Typically, the captured member 15 is under tension axially. Thus, with the release of the second end 13 of the tape 12 and the removal of the constraint on outward motion of the spool segments, the axial pull by the captured member forces the segments of the spool outward in a radial direction. The tape 12 has released and unwound in an orderly fashion, and has remained in plane. The segments of the spool 11 are seen in a position further from the center axis of the constrained spool.

Another advantage of the overlaying tape is that the tape layers have friction between them, and thus the tension on the tape is reduced in the radially outward direction with each successive wrap. The tension, therefore, on the release mechanism may be significantly lower than the tension at the center of the tape. Thus, a release device, such as a fuse, with a low load capability may be used to release the tape.

Figure 2:
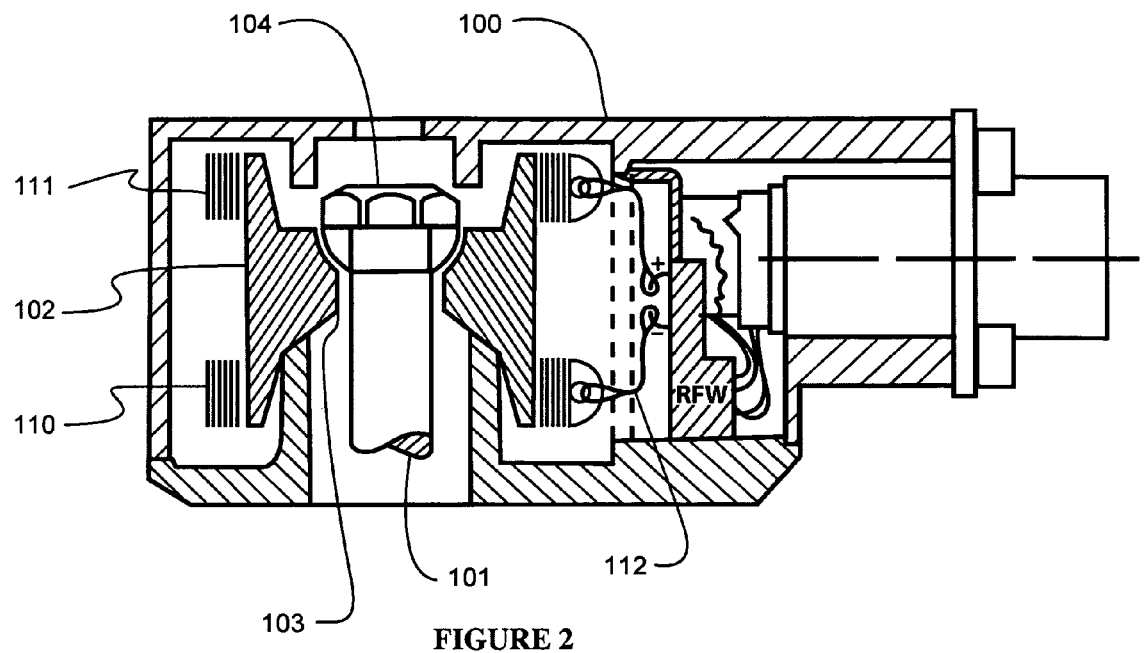
FIG. 2 is a cutaway side view of a stowed redundant release apparatus according to some embodiments of the present invention.
Figure 3:
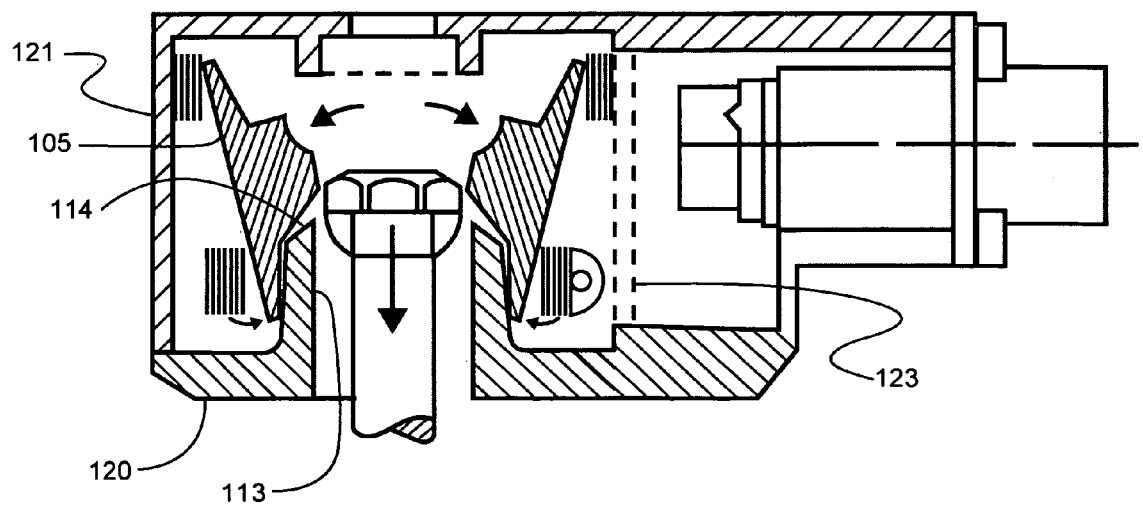
FIG. 3 is a cutaway side view of a redundant release apparatus according to some embodiments of the present invention.

FIG. 2 illustrates a redundant release apparatus in the stowed position, and FIG. 3 illustrates a redundant release apparatus is a deployed position, according to some embodiments of the present invention. A redundant release apparatus 100 may control the deployment of a selected device by releasing a captured member 101. A multi-piece split spool 102 consists of six segments 105 which define a central bore 103. The central bore 103 is sized such that the expanded portion 104 of the captured member 101 is constrained from downward axial motion by the interface portion of the segments 105 of the spool 102.

Figure 4A:
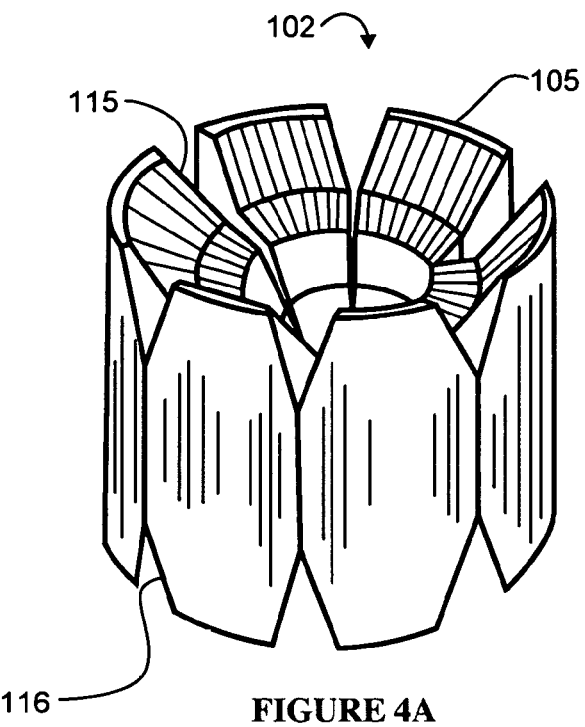
FIGS. 4A-B are views of a segmented spool according to some embodiments of the present invention.

The segments 105 of the spool 102 are constrained from motion in the external radial direction by a wound upper restraining tape 111 and a wound lower restraining tape 110. A first end of the tapes 110, 111 may be constrained from motion along the exterior of the spool by attachment to one of the segments of the spool. A second end of the tapes 110, 111 may be constrained by a fuse wire release device 112 or other means. As seen in FIG. 4A, the segments 105 of the spool 102 may have openings 115, 116 in the upper and lower ends of the spool. The openings are adapted to allow for easier opening of the spool from either the top or the bottom, as when one of the tapes is released.

The apparatus housing may include a wall 123 adapted to separate the spool and tapes from the electrical interface portion of the system. The housing may have a circular inner profile adapted to reduce the likelihood that the tapes, as they unwind and expand radially during the release cycle, will hang up on any inner surfaces. Vertical members may be in place to further separate the inner compartment.

Figure 4B:
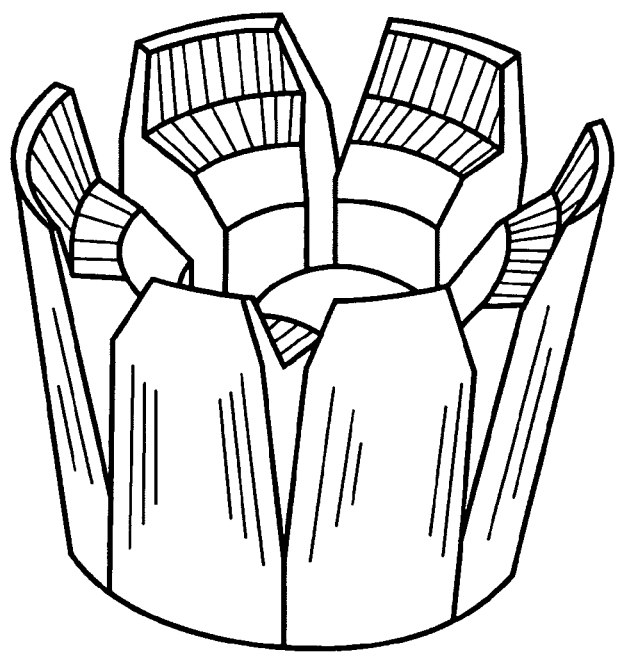

The spool segments 105 are adapted to reside upon a central support 113 which is attached to or integral with the base 120 of the housing 121 of the apparatus. The spool segments 105 are further adapted to allow for a variety of release modes. In a first release mode, the upper restraining tape 111 is released, resulting in a spreading of the upper portion of the spool 102, as seen in FIGS. 3 and 4B. In this first release mode, the segments 105 spread at their upper end in conjunction with the release of the upper restraining tape 111. Although not constrained to a single type of motion, the segments 105 predominantly pivot off the top 114 of the central support in this release mode. The expanded portion 104 of the restrained member 101 provides radial force upon the spool segments 105, allowing for the release of the restrained member. The release of the upper restraining tape 111 may be a selected mode of release in some embodiments.

Figure 5:
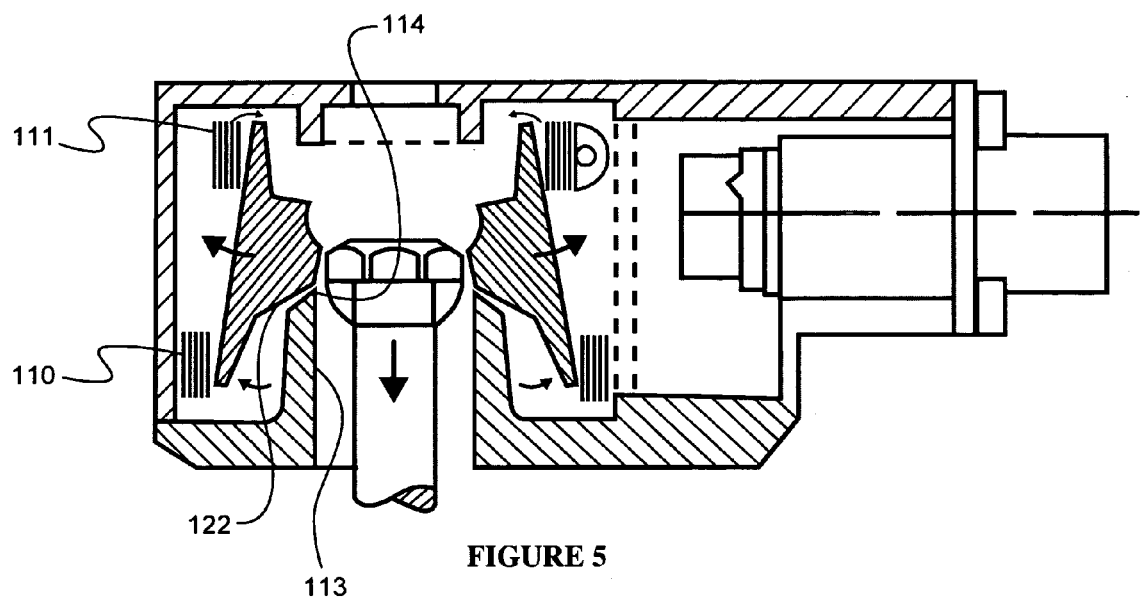
FIG. 5 is a cutaway side view of a redundant release apparatus according to some embodiments of the present invention.

In a second release mode, as seen in FIG. 5, the lower restraining tape 110 is released, resulting in a spreading of the lower portion of the spool 102. In this second release mode, the segments 105 spread at their lower end in conjunction with the release of the lower restraining tape 110. The bottom portions of the spool segments predominantly slide along their bottom surface 122 along the inclined top 114 of the central support 113, although pivoting may also be involved.

Figure 6:
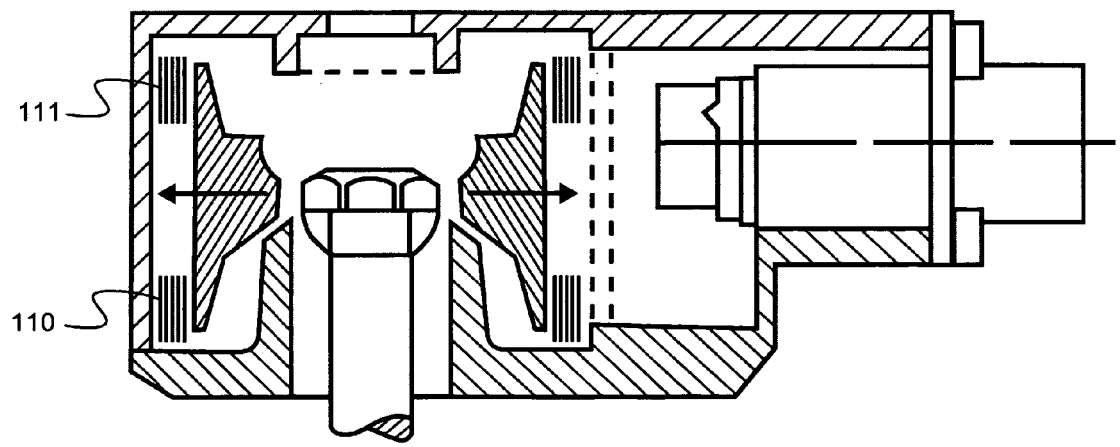
FIG. 6 is a cutaway side view of a redundant release apparatus according to some embodiments of the present invention.

In a third release mode, as seen in FIG. 6, both the upper restraining tape 111 and the lower restraining tape 110 may be released allowing for a spreading of both the lower portion and the upper portion of the spool. In this mode, the spool segments may pivot or slide, or a combination of the two, as the expanded portion of the restrained member forces the segments outward due to the tension in the member.

Figure 7A:
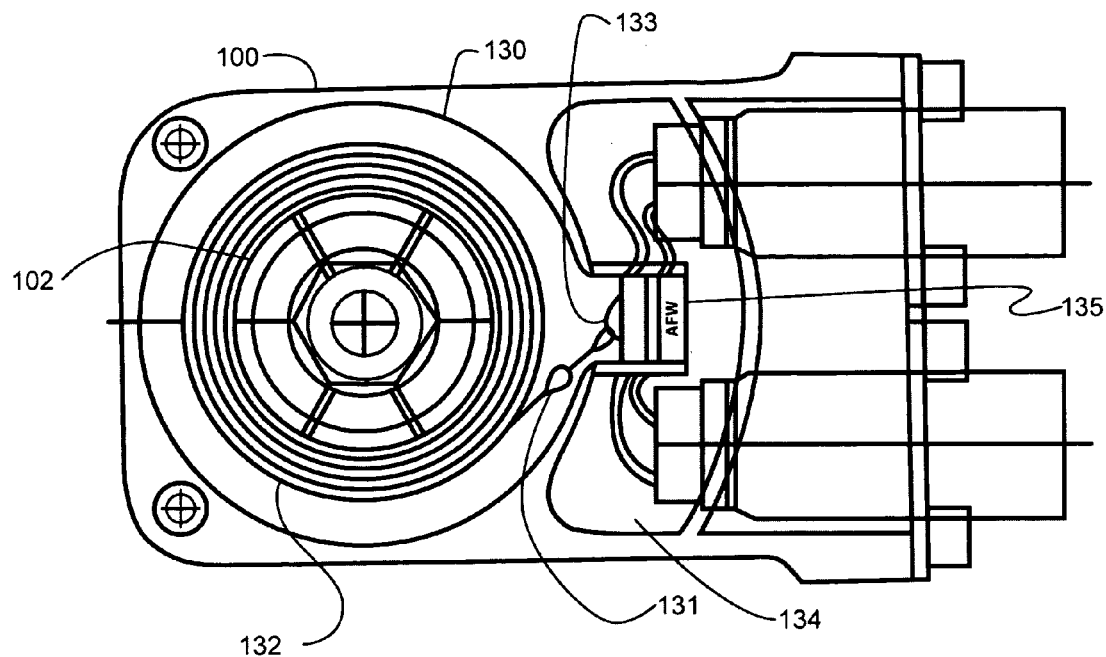
FIGS. 7A-B are top views of portions of a release apparatus according to some embodiments of the present invention.
Figure 7B:
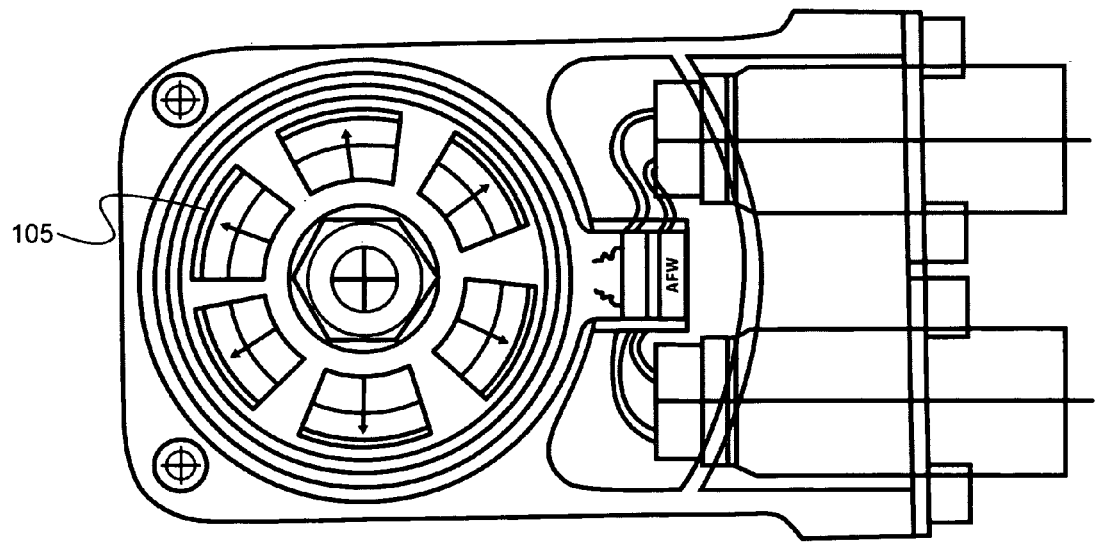

FIGS. 7A-B illustrate the third release mode in a top view both prior to release and after release. The redundant release apparatus 100 is seen with an first internal cavity 130 adapted to minimize any potential interferences, and potential catch points, for the restraining tapes as they are released and expand radially, allowing the segments 105 of the spool 102 to expand. A first end of the restraining tapes may be captured within one of the spool segments 132, which may have a slot or other means adapted to capture the end of the tape.

Figure 8A:
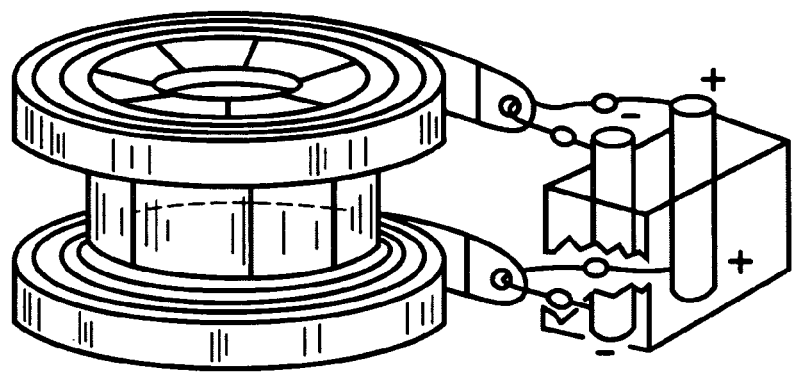
FIGS. 8A-C illustrate a spool wound with an upper and lower restraining tape with two fuse wires according to some embodiments of the present invention.
Figure 8B:
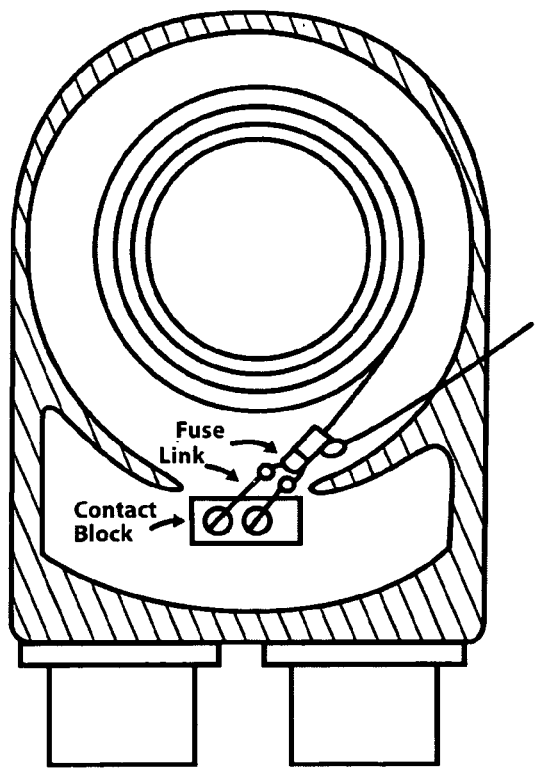
Figure 8C:
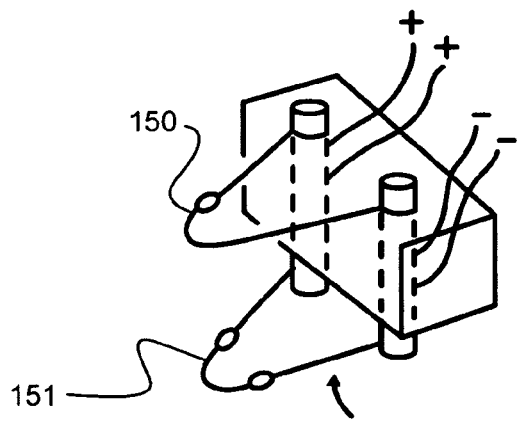

A second internal cavity 134 allows for the placement of a release device 135. The release device 135 may be an electrically actuated fuse wire release device in some embodiments. FIGS. 8A-C and 9A-B illustrate alternate configurations of the release device and fuse wire according to some embodiments of the present invention. As seen in FIGS. 8A-C, a first fuse link 150 may be attached to the upper restraining tape, and a second fuse link 151 may be attached to the lower restraining tape. This configuration allows for the release of one or both of the restraining tapes as part of the initial release. The mechanical redundancy of the spool release modes allows for the failure of one of the fuse links while still achieving release.

Figure 9A:
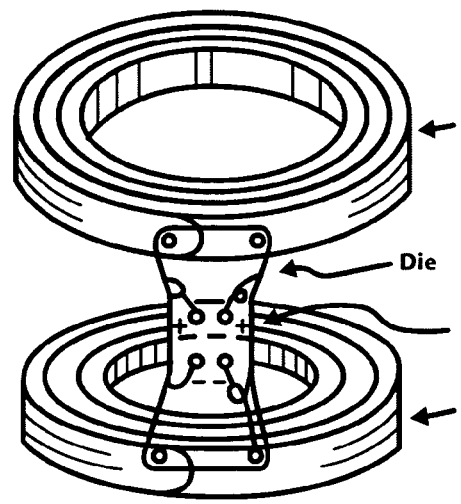
FIGS. 9A-B illustrate a dual tape release system using a single fuse wire.
Figure 9B:
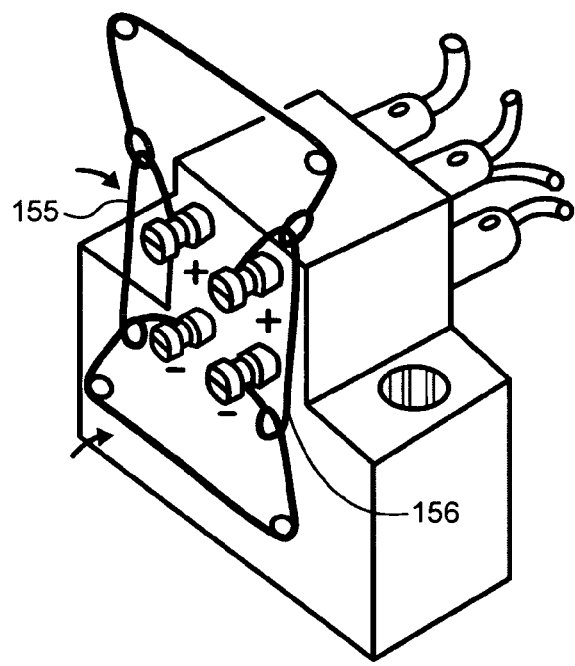
Figure 10A:
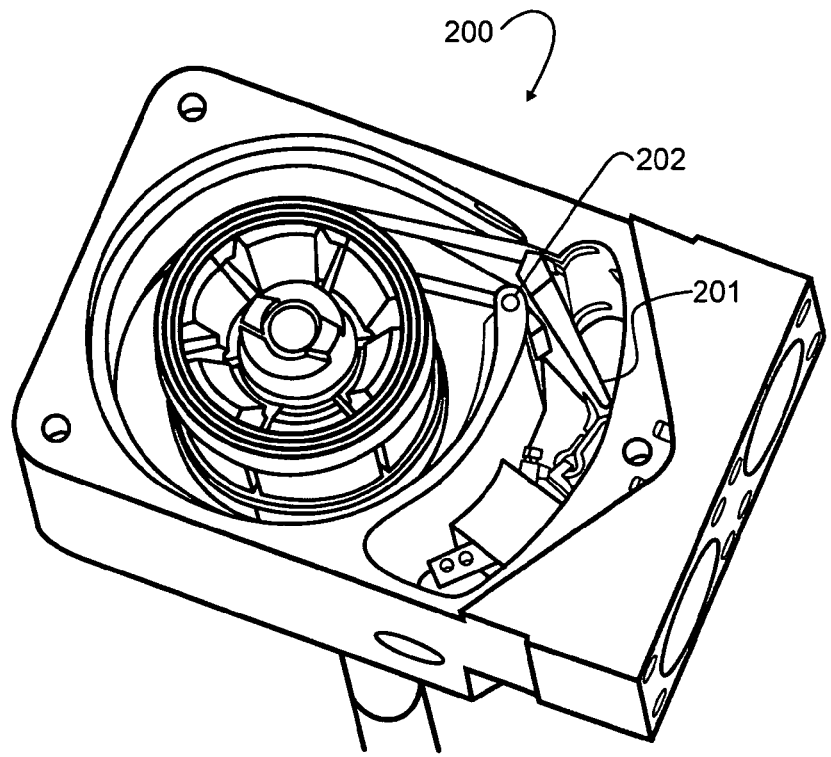
FIGS. 10A-B are a top perspective view and partial view, respectively, of a dual tape release system according to some embodiments of the present invention.
Figure 10B:
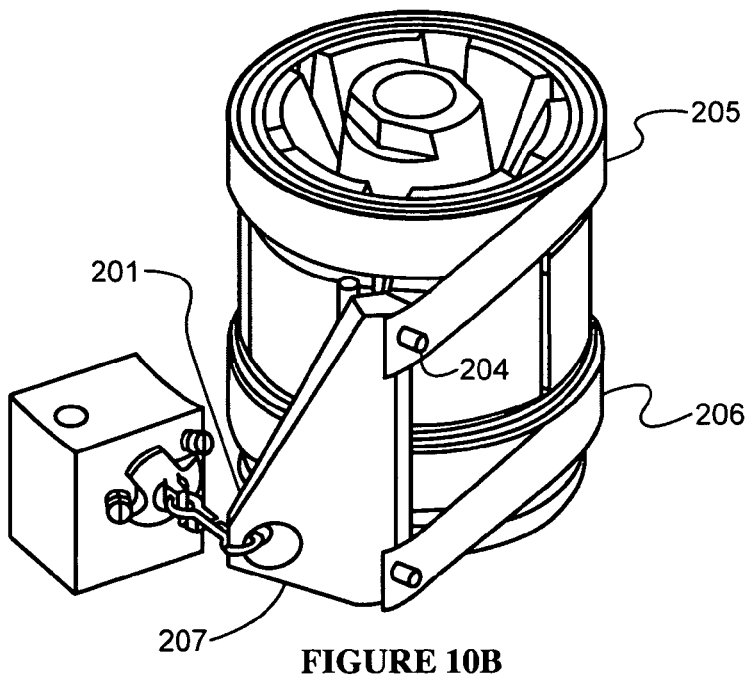

As seen in FIGS. 9A-B, a first fuse link 155 may be attached to both the upper and lower restraining tapes, and a second fuse link 156 may be similarly attached. This configuration allows for the release of both of the restraining tapes as part of the initial release. A failure of one of the fuse links thus does not preclude release of both the upper and lower restraining tapes.

FIGS. 10A, 10B, 11A, and 11B illustrate a release device 200 according to some embodiments of the present invention. A tape release lever 201 is mounted within the housing and rotates around a hinged joint 202, which may be pinned. A first end 203 of the tape release lever 201 includes tabs 204 adapted to hold the wound tapes 205, 206 under tension. The tabs 204 may be inserted into a hole in the tapes. The tape release lever 201 is adapted to hold the tapes using the tab when the lever is in a first position, and to release the tape as the lever rotates to a second position. A second end 207 of the tape release lever 201 is adapted to be constrained by a fuse wire release system 208 or other similar device. An example of such a device is seen in U.S. Pat. No. 6,133,818, to Hsieh et al. The second end 207 of the tape release lever 201 may be significantly longer than the first end 203 to allow for the tension of the tape to be held with a lower force due to the longer lever arm of the second end 207.

Figure 11A:
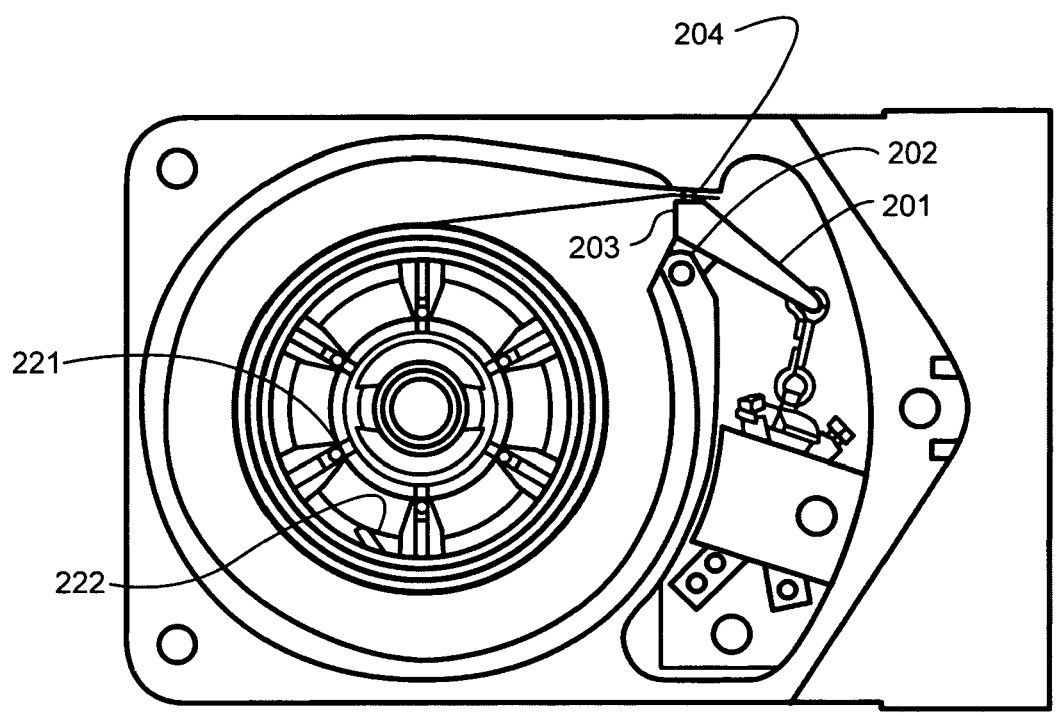
FIGS. 11A-B are a top and side cutaway view, respectively, of a dual tape release system according to some embodiments of the present invention.
Figure 11B:
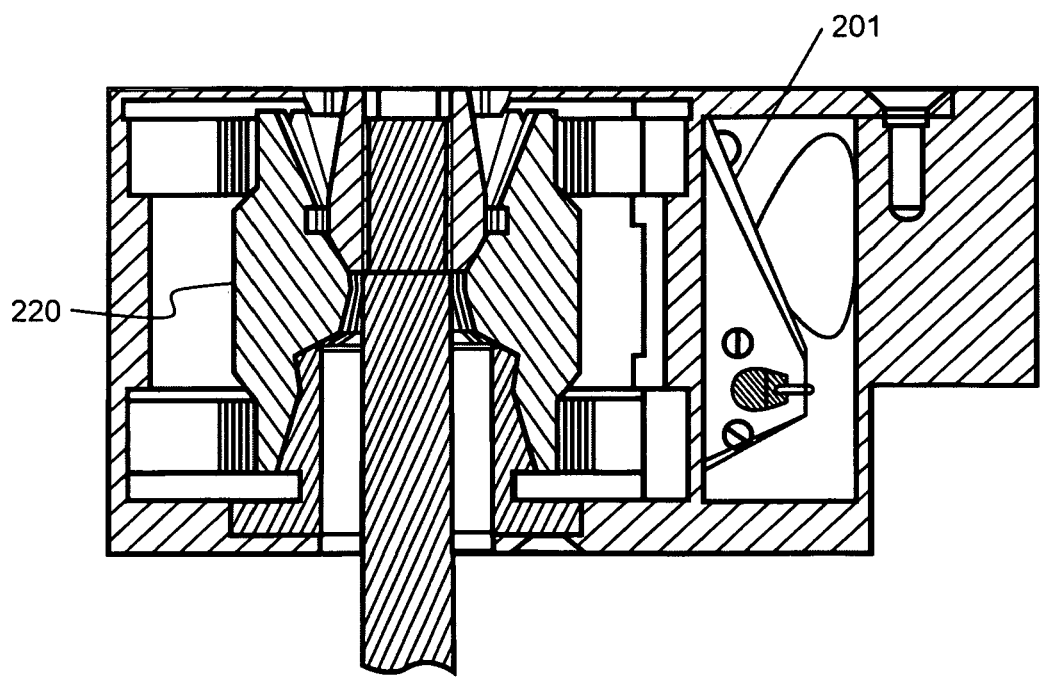

In practice, the tapes may be placed under tension by winding the tapes around the spool with the bore in a horizontal position and the tapes extended and under load. In some embodiments of the present invention, as seen in FIG. 11A, a feature may be added to prevent rotation of the spool segments while under the torsional load that may be placed upon them by the wound tapes. The spool 220 is seen made up of six segments in this embodiment. Anti-rotational pins 221 are located between the segments and are affixed to the base plate of the apparatus. The pins 221 are adapted to prevent rotation of the segments yet do not interfere with the motion of the segments upon their release.

The tapes may be anchored on a first end in a slot 222 in a spool segment adapted to receive the tape. The second end of the tape may anchored to a fuse link, release lever, or other means for release.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

I claim:

1. A release apparatus for controlling the deployment of a device by restraining or releasing a first releasable member under tension in a first direction, which respectively prevents or allows the deployment of the device, the release apparatus comprising:
   a first releasable member, said first releasable member comprising an expanded portion at a first end;
   a plurality of spool segments, said spool segments defining a center cavity along a first axis while said spool segments are in a first constrained position, said spool segments adapted to restrain said first member along said first direction while said plurality of spool segments are in said first constrained position wherein said expanded portion of said first releasable member is larger in diameter than said center cavity while said spool segments are in said first constrained position, said plurality of spool segments comprising;
   a first end;
   a second end; and
   a middle portion, wherein said middle portion comprises a narrowed interior adapted to axially constrain said expanded portion of said first releasable member along said first axis while said segments are in a first constrained position;
   a first restraining portion wound around a first end of said plurality of spool segments; and
   a second restraining portion wound around a second end of said plurality of spool segments wherein the narrowed interior portion of the spool segments may open to a second release position upon the release of either said first restraining portion of said second restraining portion.

2. The release apparatus of claim 1 wherein said first restraining portion comprises a first restraining tape wound around said plurality of spool segments with overlayed layers.

3. The release apparatus of claim 2 wherein said second restraining portion comprises a second restraining tape wound around said plurality of spool segments with overlayed layers.

4. The release apparatus of claim 3 wherein a first end of said first restraining tape and said second restraining tape are releasably attached to a release device.

5. The release apparatus of claim 4 wherein said release device comprises an electrically actuated fuse.

6. The release apparatus of claim 4 wherein a second end of said first restraining tape and said second restraining tape are attached to one or more of said plurality of spool segments.

7. The release apparatus of claim 6 further comprising:
   a housing; and
   one or more anti-rotation features, said anti-rotation features affixed to said housing between said plurality of spool segments, said anti-rotation features adapted to restrict rotary motion of said plurality of spool segments relative to said housing.

8. The release apparatus of claim 7 wherein said release device comprises a pivoting arm, wherein a first end of said pivoting arm is releasably attached to the first ends of said first and said second restraining tapes, and wherein a second end of said pivoting arm is releasably attached to an electrically actuated device.

9. The release apparatus of claim 3 wherein said plurality of spool segments are adapted to release said first member upon release of said first restraining portion.

10. The release apparatus of claim 9 wherein said plurality of spool segments are adapted to release said first member upon release of said second restraining portion.

11. The release apparatus of claim 3 wherein said plurality of spool segments are adapted to release said first member upon release of said second restraining portion.

12. The release apparatus of claim 1 wherein said plurality of spool segments are adapted to release said first member upon release of said first restraining portion without the release of said second restraining portion.

13. The release apparatus of claim 1 wherein said plurality of spool segments are adapted to release said first member upon release of said second restraining portion without the release of said restraining portion.

14. A release apparatus for controlling the deployment of a device by restraining or releasing a first member under tension in a first direction, which respectively prevents or allows the deployment of the device, the release apparatus comprising:
   a first releasable member, said first releasable member comprising an expanded portion at a first end;
   a plurality of spool segments, said spool segments adapted to restrain said first releasable member along said first direction while said plurality of spool segments are in a first constrained position;
   a first restraining portion wound around a first end of said plurality of spool segments, wherein said first restraining portion comprises a first restraining tape wound around said plurality of spool segments with overlayed layers; and
   a second restraining portion wound around a second end of said plurality of spool segments, wherein said second restraining portion comprises a second restraining tape wound around said plurality of spool segments with overlayed layers,
wherein a first end of said first restraining tape and said second restraining tape are releasably attached to a release device, and wherein said release device comprises a pivoting arm, wherein a first end of said pivoting arm is releasably attached to the first ends of said first and said second restraining tapes, and wherein a second end of said pivoting arm is releasably attached to an electrically actuated device.

15. A release apparatus for controlling the deployment of a device by restraining or releasing a first member under tension in a first direction, which respectively prevents or allows the deployment of the device, the release apparatus comprising:
   a first releasable member, said first releasable member comprising an expanded portion at a first end;
   a central spool, said central spool comprising a plurality of spool segments, said spool segments adapted to restrain an expanded portion of said first member along said first direction while said plurality of spool segments are in a first constrained position, said spool segments defining a center cavity along a first axis while said spool segments are in a first constrained position, said central spool having a narrowed interior portion, said plurality of spool segments comprising;
   a first end;
   a second end; and
   a middle portion, wherein said middle portion comprises a narrowed interior portion adapted to axially constrain said expanded portion of said first releasable member along said first axis while said segments are in a first constrained position;
   a first restraining portion wound around a first end of said central spool;
   a second restraining portion wound around a second end of said central spool; and
   a central standoff, said central standoff adapted to restrain said central spool along said first direction, said central standoff restraining said central spool along said narrowed interior portion wherein the narrowed interior portion of the spool segments may open to a second release position upon the release of either said first restraining portion of said second restraining portion.

16. The release apparatus of claim 15 wherein said first restraining portion comprises a first restraining tape wound around said central spool with overlayed layers.

17. The release apparatus of claim 16 wherein said second restraining portion comprises a second restraining tape wound around said central spool with overlayed layers.

18. The release apparatus of claim 17 wherein a first end of said first restraining tape and said second restraining tape are releasably attached to a release device.

19. The release apparatus of claim 18 wherein said release device comprises an electrically actuated fuse.

20. The release apparatus of claim 18 wherein a second end of said first restraining tape and a second end of said second restraining tape are attached to one or more of said plurality of spool segments.

21. The release apparatus of claim 20 further comprising:
   a housing; and
   one or more anti-rotation features, said anti-rotation features affixed to said housing between said plurality of spool segments, said anti-rotation features adapted to restrict rotary motion of said plurality of spool segments relative to said housing.

22. The release apparatus of claim 17 wherein said plurality of spool segments are adapted to release said first member upon release of said first restraining portion without the release of said second restraining portion.

23. The release apparatus of claim 17 wherein said plurality of spool segments are adapted to release said first member upon release of said second restraining portion without the release of said first restraining portion.

24. The release apparatus of claim 15 wherein said plurality of spool segments are adapted to release said first member upon release of said first restraining portion without the release of said second restraining portion.

25. The release apparatus of claim 15 wherein said plurality of spool segments are adapted to release said first member upon release of said second restraining portion without the release of said first restraining portion.

* * * * *